United States Patent
Shin et al.

(10) Patent No.: US 7,826,405 B2
(45) Date of Patent: *Nov. 2, 2010

(54) WIRELESS LOCAL AREA NETWORK SYSTEM CAPABLE OF SUPPORTING HOST MOBILITY AND AN OPERATION METHOD THEREFOR

(75) Inventors: Dong-yun Shin, Seosan-si (KR); Jin-hyeock Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1117 days.

This patent is subject to a terminal disclaimer.

(21) Appl. No.: 10/806,420

(22) Filed: Mar. 23, 2004

(65) Prior Publication Data

US 2004/0240445 A1  Dec. 2, 2004

(30) Foreign Application Priority Data

Apr. 29, 2003  (KR) .................. 10-2003-0027310

(51) Int. Cl.
*H04W 4/00* (2009.01)
(52) U.S. Cl. .............. 370/328; 370/338; 370/389; 370/392; 455/435.1; 455/436
(58) Field of Classification Search ............. 370/349, 370/395.31, 401, 466, 312, 331, 338, 392, 370/329, 340, 400, 406, 310, 310.2, 313, 370/328, 352; 455/432.1, 435.1, 436, 456.1; 709/239, 241, 244, 245
See application file for complete search history.

(56) References Cited

U.S. PATENT DOCUMENTS 6,496,704 B2 * 12/2002 Yuan ..................... 455/466
6,654,607 B1 * 11/2003 Shobatake et al. ......... 455/433
6,845,094 B1 * 1/2005 Zhang ..................... 370/349
6,957,262 B2 * 10/2005 Kimura et al. ............ 709/227
6,965,584 B2 * 11/2005 Agrawal et al. ........... 370/331

(Continued)

FOREIGN PATENT DOCUMENTS

JP  2002-271377 A  9/2002

(Continued)

OTHER PUBLICATIONS

S. Thomson (Bellcore), et al., "IPv6 Stateless Address Autoconfiguration", IETF-RFC 2462, Dec. 1998, pp. 1-25, XP015008246.

*Primary Examiner*—Aung S Moe
*Assistant Examiner*—Abdullah Riyami
(74) *Attorney, Agent, or Firm*—Sughrue Mion, PLLC

(57) ABSTRACT

A wireless local area network system capable of supporting host mobility services and an operation method therefor. The wireless local area network system includes a gateway performing the functions of a home agent in mobile wireless communication environments and sending prefix information; and access points, each access point allocating an Internet Protocol (IP) address to a mobile host within a range thereof by using prefix information of the gateway. Thereafter, each access point produces and sends a Binding Update list that corresponds to the mobile hosts to the gateway. Thus, the present invention supports the mobility for mobile hosts with or without a mobile IPv6 stack, in a wireless local area network.

16 Claims, 9 Drawing Sheets

U.S. PATENT DOCUMENTS

| | | | |
|---|---|---|---|
| 7,039,028 B2 * | 5/2006 | Chen et al. | 370/331 |
| 7,039,035 B2 * | 5/2006 | Droms et al. | 370/338 |
| 7,123,599 B2 * | 10/2006 | Yano et al. | 370/331 |
| 7,215,668 B2 * | 5/2007 | Saito | 370/392 |
| 7,251,238 B2 * | 7/2007 | Joshi et al. | 370/338 |
| 7,289,504 B1 * | 10/2007 | Hippelainen et al. | 370/392 |
| 7,362,756 B2 * | 4/2008 | Choi et al. | 370/389 |
| 7,453,842 B2 * | 11/2008 | Yamamoto | 370/328 |
| 7,593,362 B1 * | 9/2009 | Casati et al. | 370/328 |
| 2002/0039357 A1 | 4/2002 | Lipasti et al. | |
| 2002/0057657 A1 * | 5/2002 | La Porta et al. | 370/331 |
| 2002/0105956 A1 * | 8/2002 | Saito | 370/401 |
| 2002/0126642 A1 | 9/2002 | Shitama | |
| 2002/0126665 A1 * | 9/2002 | Ueno | 370/389 |
| 2002/0142771 A1 * | 10/2002 | Saifullah et al. | 455/436 |
| 2002/0191562 A1 * | 12/2002 | Kumaki et al. | 370/331 |
| 2002/0191627 A1 * | 12/2002 | Subbiah et al. | 370/428 |
| 2003/0012179 A1 * | 1/2003 | Yano et al. | 370/352 |
| 2003/0016844 A1 * | 1/2003 | Numaoka | 382/100 |
| 2003/0084293 A1 * | 5/2003 | Arkko et al. | 713/168 |
| 2003/0087646 A1 * | 5/2003 | Funato et al. | 455/456 |
| 2003/0093560 A1 * | 5/2003 | Ono et al. | 709/244 |
| 2003/0161287 A1 * | 8/2003 | Venkitaraman et al. | 370/338 |
| 2003/0182445 A1 * | 9/2003 | Smith et al. | 709/238 |
| 2003/0196115 A1 * | 10/2003 | Karp | 713/201 |
| 2003/0225912 A1 * | 12/2003 | Takeda et al. | 709/246 |
| 2004/0010615 A1 * | 1/2004 | Ernst et al. | 709/238 |
| 2004/0013111 A1 * | 1/2004 | Faccin | 370/378 |
| 2004/0015607 A1 * | 1/2004 | Bender et al. | 709/238 |
| 2004/0063402 A1 * | 4/2004 | Takeda et al. | 455/41.1 |
| 2004/0082312 A1 * | 4/2004 | O'Neill et al. | 455/405 |
| 2004/0100951 A1 * | 5/2004 | O'neill | 370/389 |
| 2004/0105420 A1 * | 6/2004 | Takeda et al. | 370/349 |
| 2004/0114554 A1 * | 6/2004 | Okajima et al. | 370/329 |
| 2004/0137888 A1 * | 7/2004 | Ohki | 455/417 |
| 2004/0158639 A1 * | 8/2004 | Takusagawa et al. | 709/229 |
| 2004/0203596 A1 * | 10/2004 | Sreemanthula et al. | 455/411 |
| 2004/0203740 A1 * | 10/2004 | Won et al. | 455/426.1 |
| 2004/0205211 A1 * | 10/2004 | Takeda et al. | 709/230 |
| 2004/0205235 A1 * | 10/2004 | Matsuhira | 709/238 |
| 2004/0213260 A1 * | 10/2004 | Leung et al. | 370/395.3 |
| 2004/0258008 A1 * | 12/2004 | Inoue et al. | 370/312 |
| 2005/0020265 A1 * | 1/2005 | Funabiki et al. | 455/436 |
| 2005/0078635 A1 * | 4/2005 | Choi et al. | 370/331 |
| 2005/0088994 A1 * | 4/2005 | Maenpaa et al. | 370/331 |
| 2005/0111377 A1 * | 5/2005 | Lioy et al. | 370/252 |
| 2005/0147062 A1 * | 7/2005 | Khouaja et al. | 370/332 |
| 2005/0226197 A1 * | 10/2005 | Reddy et al. | 370/338 |
| 2005/0271034 A1 * | 12/2005 | Asokan et al. | 370/349 |
| 2005/0272438 A1 * | 12/2005 | Holur et al. | 455/452.2 |
| 2006/0010250 A1 * | 1/2006 | Eisl et al. | 709/245 |
| 2006/0013170 A1 * | 1/2006 | Shin et al. | 370/338 |
| 2006/0062214 A1 * | 3/2006 | Ng et al. | 370/389 |
| 2006/0276209 A1 * | 12/2006 | Neves et al. | 455/466 |
| 2007/0005971 A1 * | 1/2007 | Leung et al. | 713/171 |
| 2007/0105555 A1 * | 5/2007 | Miernik et al. | 455/435.1 |
| 2008/0013487 A1 * | 1/2008 | Molteni et al. | 370/329 |

FOREIGN PATENT DOCUMENTS

| | | |
|---|---|---|
| JP | 2003-018193 A | 1/2003 |

* cited by examiner

MN :: MAC ADDRESS OF A MOBILE HOST

FIG. 8A

| HA.mac3 | AP.mac2 | CN.mac4 | MN.mac1 |

FIG. 8B

| Src = AP.mac2 | Dest = HA.mac4 | HOA = MN.mac1 |

| Src = CN.mac4 | Dest = AP.mac2 | HOA = MN.mac1 |

WIRELESS LOCAL AREA NETWORK SYSTEM CAPABLE OF SUPPORTING HOST MOBILITY AND AN OPERATION METHOD THEREFOR

CROSS-REFERENCE RELATED APPLICATIONS

This application claims the benefit of Korean Patent Application No. 10-2003-0027310, filed Apr. 29, 2003, in the Korean Intellectual Property Office, the disclosure of which is incorporated herein by reference.

BACKGROUND OF THE INVENTION

1. Field of the Invention

A system and method consistent with the present invention relates to a wireless local area network system, and more particularly, to a wireless local area network system and an operation method therefor in which the system has access points (APs) capable of supporting host mobility.

2. Description of the Related Art

With the fast spread of wireless communications and the growth of the Internet, Internet services in wireless environments have been increasingly demanded and, accordingly, users want to use the Internet through wireless communication services by which mobility can be guaranteed. Wireless communication technologies such as wireless LAN, mobile IP, MANET, and so on, have given rise to recent active research and development.

Of the communication networks, the wireless local area network (WLAN) has an advantage of supporting services of a certain standard, but also has a disadvantage in that its use is limited to a certain range.

A general wireless IPv6 host without a mobile IPv6 stack has a problem of poor continuity of services occurring when the host moves to an access point (AP) for a different router.

FIG. 1 is a view for schematically showing a conventional general wireless local area network system.

A wireless local area network 100, which may be a network in a corporation or a network in a campus, has a gateway 10 connected to the Internet 200 which is an external network, the gateway 10 has plural access routers (ARs) 20 and 30 connected thereto, for example, and one access router AR1 20 has plural access points (APs) 21, 22, . . . , and 31 connected thereto, each of which deals with mobile hosts (MH) within a certain range thereof. In here, the mobile hosts under the access router AR1 20 are assigned IP addresses based on prefix information (Prefix:A) of the access router AR1.

However, such a conventional wireless local area network has the following limits to the mobility support for the mobile hosts.

For example, if a mobile host (MH) associated with an AP AP1_1 21 connected to the first access router AR1 20 moves into a range dealt with by an access point AP1_2 22 connected to the first access router AR1 20, the mobile host (NH) is supported by the access point AP1_2 22. That is, the access points AP1_1 21 and AP1_2 22 connected to the first access router AR1 20 can communicate with each other through the Inter Access Point Protocol (IAPP). Accordingly, if the mobile host (MH) communicating with the Internet 200 by using the access point AP1_1 21 moves into a range covered by the access point AP1_2 22, the mobile host (MH) can be continuously provided with current services through the IAPP.

However, if the mobile host (MH) moves into a range of an access point AP2 31 connected to a second access router AR2 30, the mobile host (MH) is assigned a new Internet Protocol (IP) address by the access point AP2 and, at this time, prefix information of the IP address is based on prefix information (Prefix:B) of the second access router AR2 30.

Accordingly, the mobile host (MH) is recognized as a new network and undergoes a new association process, so it cannot continuously receive current services.

SUMMARY OF THE INVENTION

Illustrative embodiments of the present invention may, but are not required to, solve the above and/or other problems. It is an exemplary aspect of the present invention to provide a wireless local area network system and an operation method therefor in which the system has access points (APs) capable of supporting the mobility of mobile hosts.

In order to achieve the above aspect, a wireless local area network system according to the present invention comprises a gateway performing functions of a home agent in a mobile wireless communication environment and sending prefix information; and access points each of which is capable of allocating an Internet Protocol (IP) address to a mobile host within a range thereof by using the prefix information of the gateway, wherein each access point produces and sends a Binding Update list corresponding to the mobile host to the gateway.

When a packet is sent from a correspondent node to the mobile host, the gateway encapsulates a header portion of the packet with a source address and a destination address, and the access points each decapsulate the encapsulated packet sent from the gateway.

When a packet is sent from the mobile host to a correspondent node, the access points each encapsulate a header portion of the packet with a source address and a destination address and send the encapsulated packet.

Preferably, but not necessarily, the gateway manages at least one or more access routers, the access routers each manage one or more access points, and the access points each manage one or more mobile hosts, and IP addresses for the mobile hosts have the same prefix information. Further, an IP address for each access point serves as a Care-of Address (CoA) for each managed mobile host.

The access points each include an IP address generation unit for generating the IP address for a mobile host in the management range by combining the prefix information and a MAC address of the mobile host; a binding cache for storing information on the allocated IP address and the associated mobile host; and a Binding Update (BU) transmission unit for sending to the gateway the produced Binding Update list for the mobile host.

Further, the access points each have a decapsulation unit for decapsulating a source address and a destination address that are encapsulated with a header portion of a packet sent from a correspondent node, and an encapsulation unit for encapsulating a header portion of a packet to be sent to a correspondent node with a source address and a destination address.

An operation method for a wireless local area network system according to the present invention comprises the steps of sending prefix information according to a request of a mobile host wherein a gateway performs functions of a home agent in mobile wireless communication environments; allocating an Internet Protocol (IP) address to the mobile host by using the prefix information and associating the mobile host; and producing a Binding Update list for the associated mobile host and sending the Binding Update list to the gateway.

The operation method further comprises the steps of, when a packet is sent from a correspondent node to the mobile host, encapsulating a header portion of the packet from the gateway with a source address and a destination address and sending the encapsulated packet; and decapsulating a header portion from the encapsulated packet sent from the gateway.

Further, the operation method further comprises the steps of, when a packet is sent from the mobile host to a correspondent node, encapsulating a header portion of a packet with a source address and a destination address, and sending the encapsulated packet.

Preferably, but not necessarily, the gateway manages one or more access routers, the access routers each manage one or more access points, the access points each manage one or more mobile hosts, and IP addresses for the mobile hosts have the same prefix information. Further, An IP address for each access point serves as a Care-of Address (CoA) for each managed mobile host.

The mobile host association step includes the steps of generating the IP address for a mobile host in the management range by combining the prefix information and a MAC address of the mobile host; storing information on the allocated IP address and the mobile host, and producing a Binding Update list of the associated mobile host; and sending to the gateway the produced Binding Update list for the mobile host.

Accordingly, mobile hosts in a wireless local area network can be supported with mobility, and the mobility can be supported for all the mobile hosts with or without mobile a IPv6 stack.

BRIEF DESCRIPTION OF THE DRAWINGS

The invention will be described in detail with reference to the following drawings in which like reference numerals refer to like elements, and wherein:

FIG. 8A and FIG. 8B are views for showing an encapsulated data packet format and a format for a binding update sent to a gateway according to an illustrative embodiment of the present invention;

DETAILED DESCRIPTION OF ILLUSTRATIVE EMBODIMENTS

Hereinafter, the present invention will be described in detail with reference to the accompanying drawings.

Figure 1:
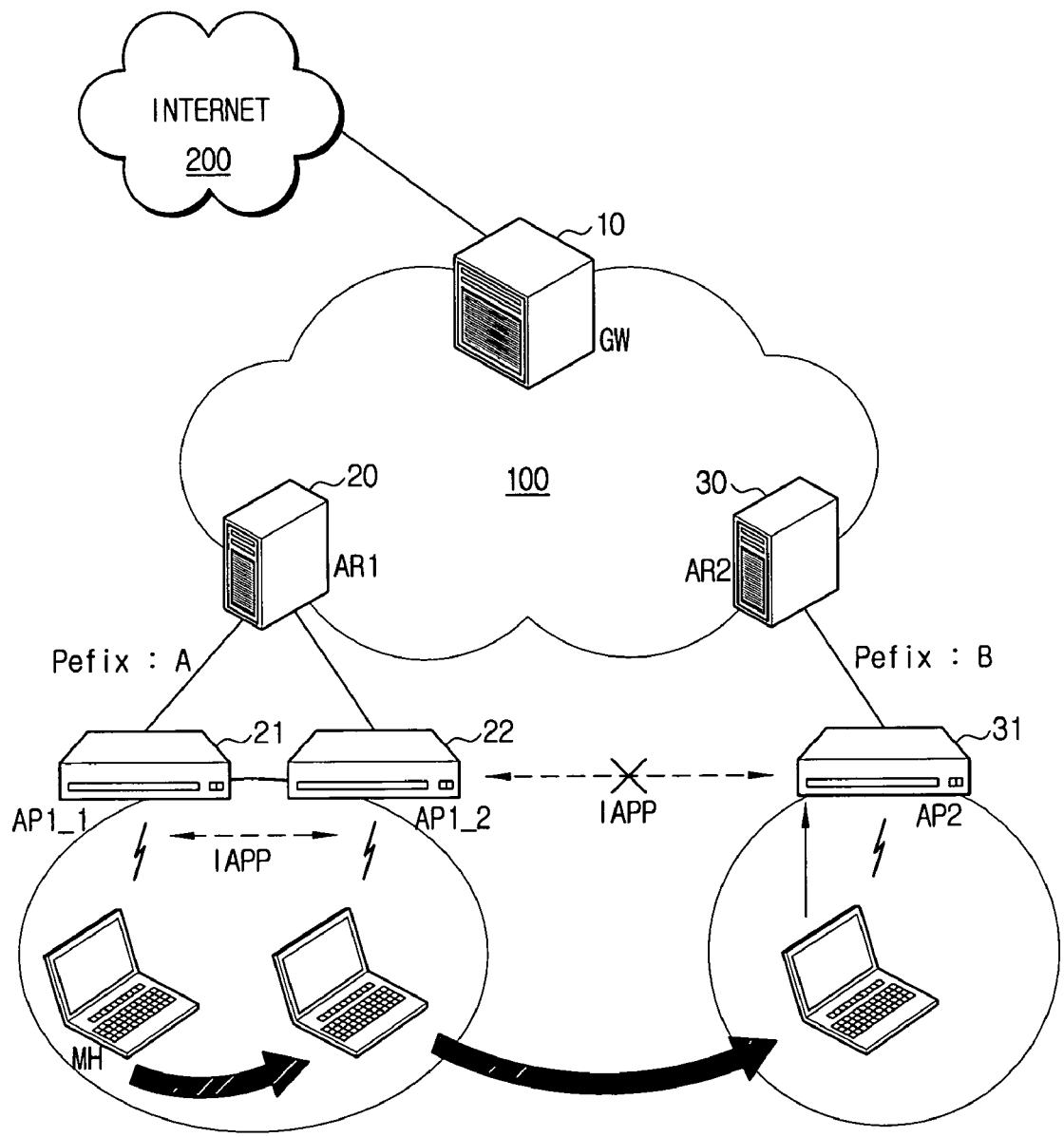
FIG. 1 is a schematic view for explaining a conventional wireless local area network system.
Figure 2:
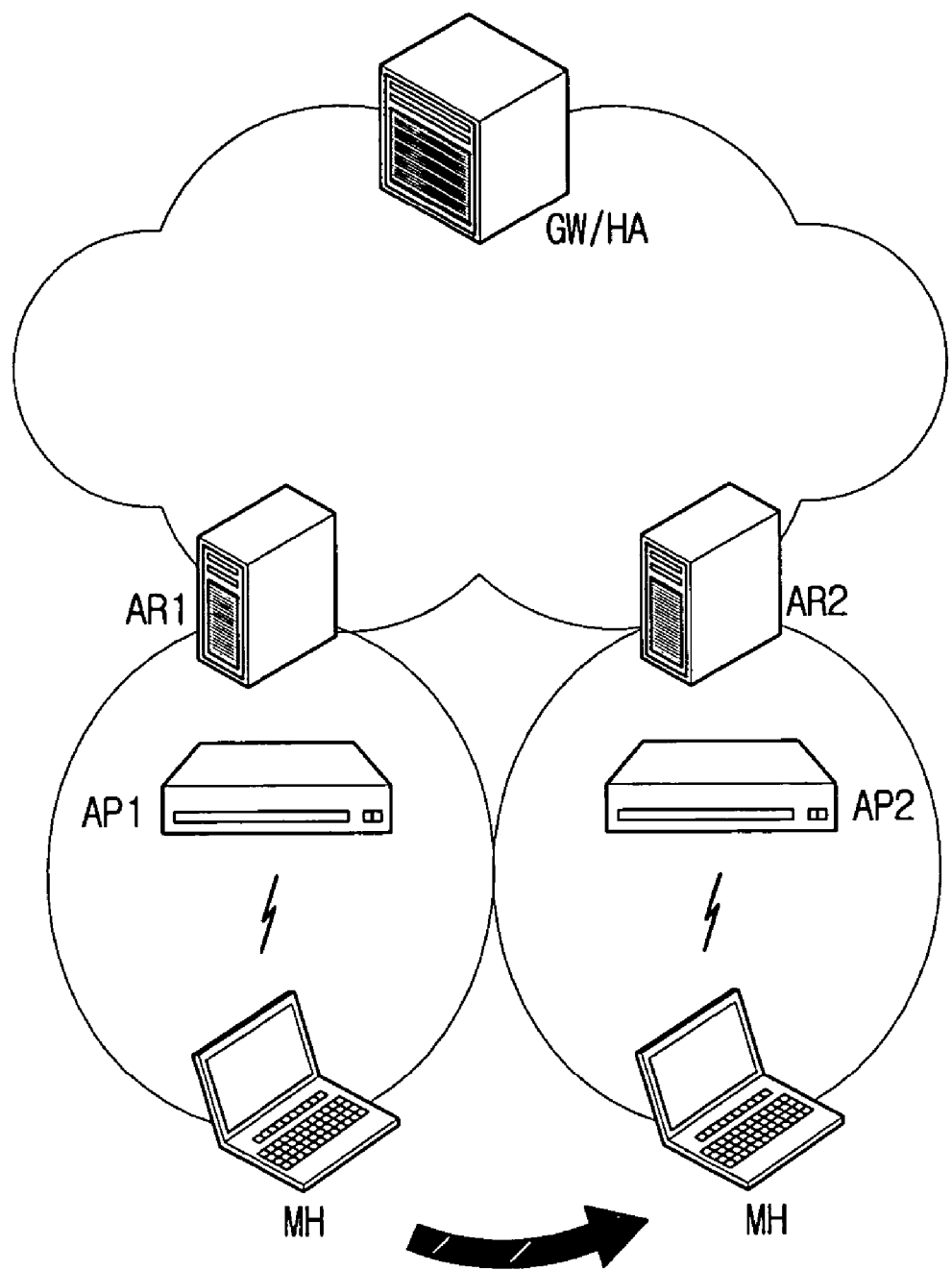
FIG. 2 is a schematic view for explaining a wireless local area network system capable of supporting mobility for mobile hosts according to an illustrative embodiment of the present invention.

FIG. 2 is a schematic view for explaining a wireless local area network system according to an illustrative embodiment of the present invention.

A wireless local area network system has a gateway GW/HA for performing communication connections with an external network, plural access routers AR1 and AR2 connected to the gateway GW/HA, plural access points AP1 and AP2 controlled by the access routers AR1 and AR2 respectively, and mobile hosts (MH) supported by the access points AP1 and AP2 respectively.

The gateway GW/HA is connected with an external network, and serves as a gateway for communicating packets from or to the external network, and the gateway function performs a mobile IPv6-based home agent function.

For the home agent function supporting mobile IPv6-based mobility, for example, there is a function for encapsulating packets on a home link destined to an IP address of a mobile host (MH) while the mobile host (MH) is away from the home and tunneling to a Care-of Address (CoA) associated with the mobile host (MH). Further, there are functions for managing a list of binding updates connecting mobile hosts' IP addresses to Care-of Addresses, and so on.

One or more access routers AR1 are connected to the gateway GW/HA, and each access router AR1 connects network layers with one another by a device connecting separated networks using the same transmission protocol.

The function of the access router AR1, in addition to the function a bridge has, decides a mobile node, that is, a mobile host (MH) in a different network or a self-network depending upon a path allocation table and, accordingly, selects the most efficient path of various paths and sends packets through the selected path.

The access point AP1 is connected to the access router AR1, and one or more access points AP1 are connected to one access router AR1. Here, the access point AP1 processes a network layer in order to support the mobility of the mobile host (MH), so it is assigned an IP address from the access router AR1. The assigned IP address of the access point AP1 serves as a CoA for all mobile hosts (MH) connected the access point (AP).

The access point (AP) for supporting the mobility of a mobile host according to the present invention is described in detail with reference to the block diagram of the access point (AP) 300 shown in FIG. 3.

The access point (AP) 300 has an N/W input/output unit 303, a MAC storage unit 307, an IP address generation unit 310, a binding cache 330, an encapsulation unit 350, a decapsulation unit 370, and a Binding Update (BU) transmission unit 390.

The N/W input/output unit 303 is connected to devices on a network in a wireless manner, and inputs and outputs data transmitted through a network protocol.

The MAC storage unit 307 stores software for performing diverse functions of the access point (AP) 300 and, further, stores Media Access Control (MAC) addresses which are addresses for standard data layers necessary for all ports or devices connected to a LAN.

The IP address generation unit 310 generates an IP address for a mobile host (MH) to be connected to the access point (AP). The IP address of the mobile host (MH) has a format shown in FIG. 4. The mobile hosts (MHs) in all the networks controlled by the gateway GW/HA each have the same prefix in addition to a mobile host ID, that is, a MAC address.

Figure 5:
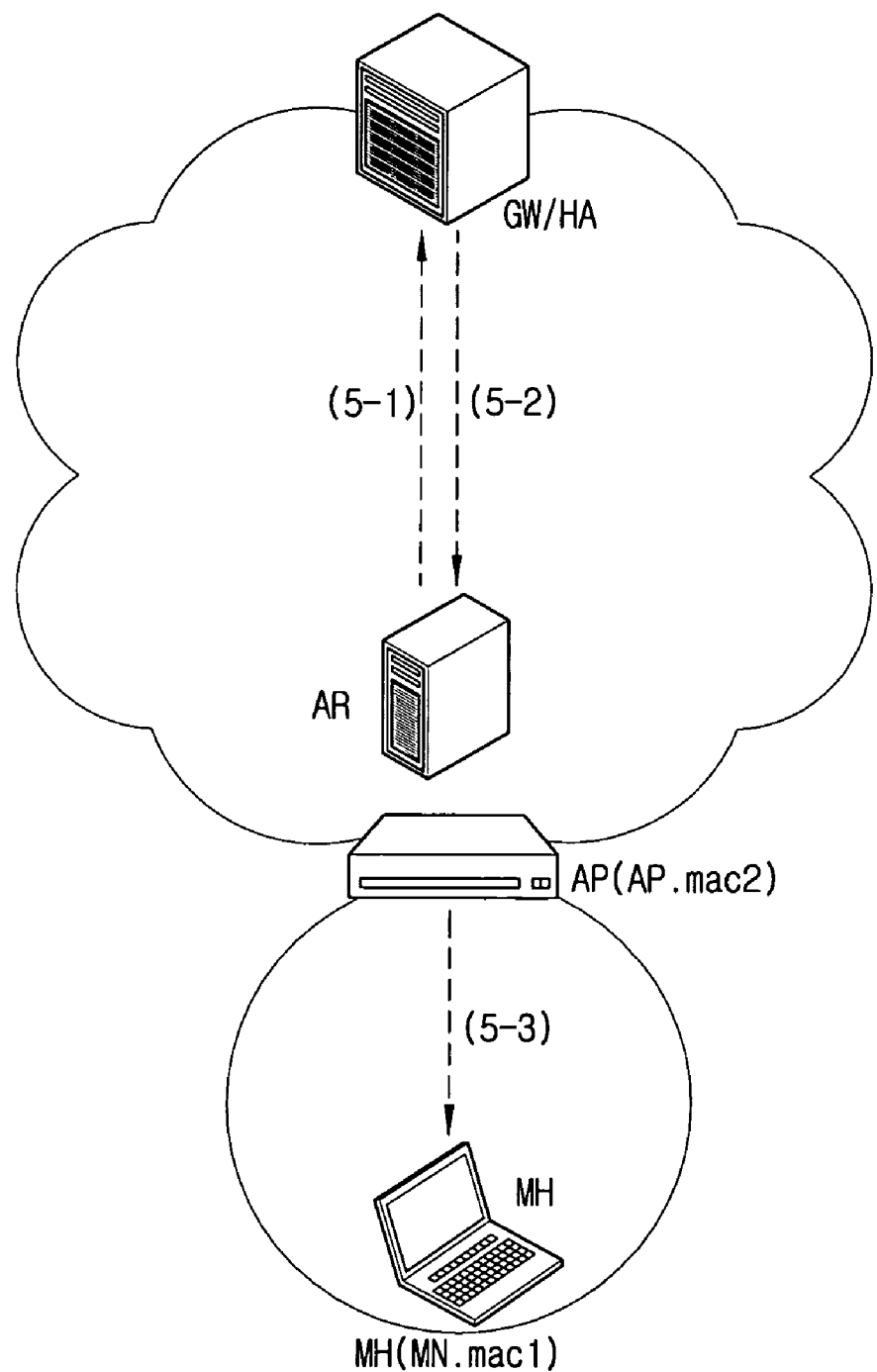
FIG. 5 is a view for showing operation flows for a process for generating mobile host IP addresses of FIG. 4.

FIG. 5 is a view for explaining a process for generating an IP address.

First, the access point (AP) sends a mobile host prefix request message to the gateway GW/HA (5-1). The gateway that has received the prefix request message responds with a prefix advertisement message (5-2).

The router advertisement message of the access router (AR) based on the prefix advertisement message of the gateway GW/HA is sent to the access point (AP). Accordingly, the access point (AP) recognizes a prefix of the gateway GW/HA, translates the prefix information of the gateway GW/HA into a prefix of the mobile host (MI) and sends the translated prefix to the mobile host (MH) (5-3). Here, the advertisement message is a message whereby the gateway GW/HA, access router (AR), or the like, notifies neighboring devices of its existence all the time in the wireless manner.

Accordingly, even though the mobile host (MH) moves in a range of any access point (AP), the mobile host (MH) has the same prefix which is the prefix of the gateway GW/HA. Therefore, the IP address of the access point (AP) serves as a Care-of Address (CoA) for all the mobile hosts (MHs) connected to the access point (AP).

The binding cache 330 manages information on mobile hosts (MHs) existing in a range of an access point (AP) in order for the mobile hosts and the gateway GW/HA to communicate with each other. Further, in a case that a new mobile host becomes associated with the access point, the binding cache 330 produces a binding update list.

The encapsulation unit 350 encapsulates a packet header with a source address and a destination address in order to directly send a packet by tunneling from an access point (AP) to an external correspondent node (CN) in a case that a mobile host (MH) sends the packet to the correspondent node (CN). Here, the source address is the IP address of the access point (AP), and the destination address is the IP address of the correspondent node (CN).

The decapsulation unit 370 decapsulates the source address and the destination address from the header portion of the encapsulated packet in order to forward the packet to an access point (AP) in which the mobile host (MH) exists from the gateway GW/HA.

The Binding Update (BU) transmission unit 390 sends a Binding Update list to the gateway GW/HA. For this, there are two exemplary cases as follows.

The first case is to associate to a gateway GW/HA the mobile hosts existing in a range of an access point (AP). The second case is to accomplish an optimized path through associating a Binding Update list from the access point (AP) to a correspondent node (CN).

Hereinafter, an access point operation process according to the present invention will be described in detail with reference to the accompanying drawings.

Figure 6:
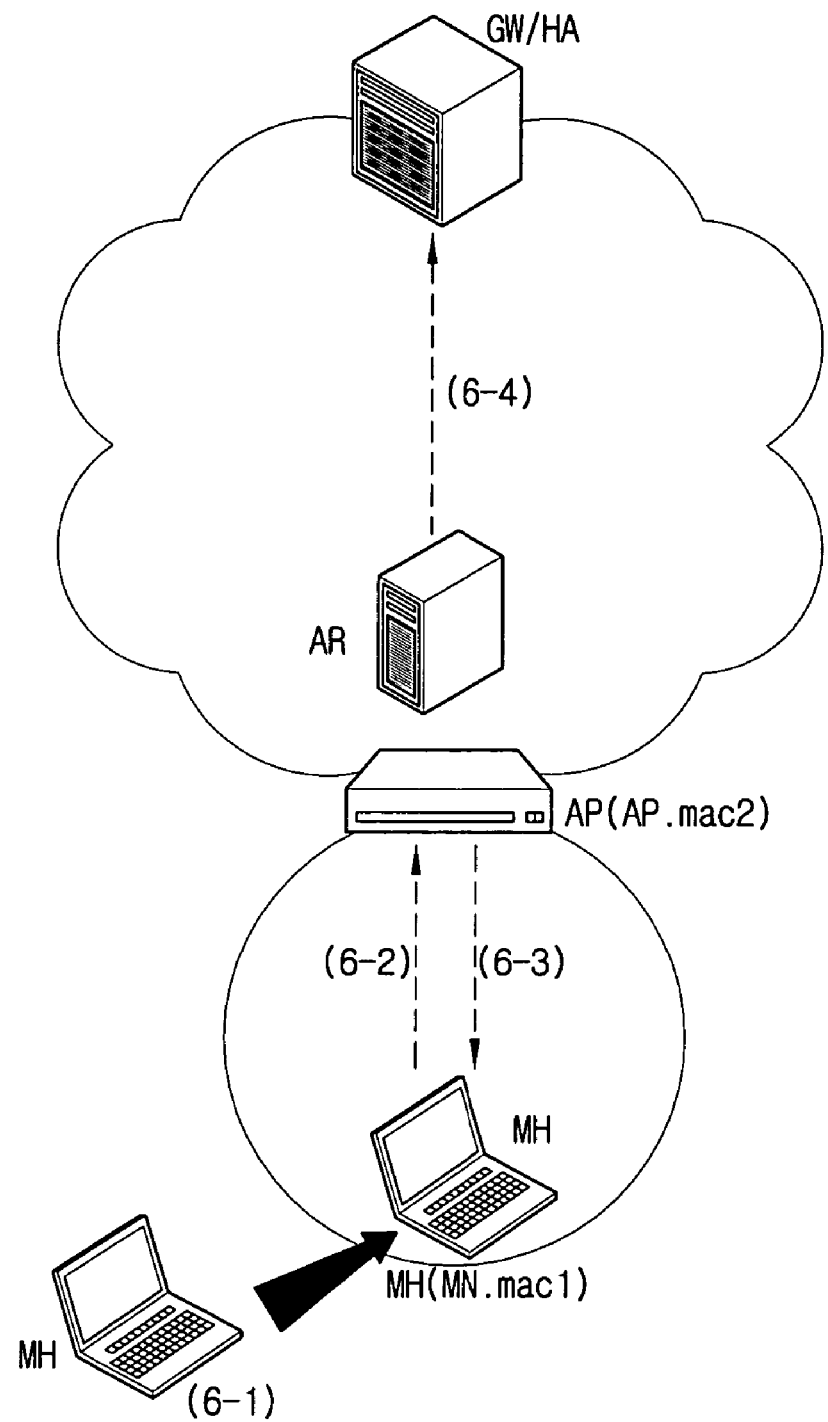
FIG. 6 is a view for showing operation flows for a process for associating mobile hosts according to an illustrative embodiment of the present invention.

(1) A process for associating a mobile host (MH) to an access point (AP) when a mobile host (MH) moves in a range of an access point (AP)(6-1) will be described with reference to FIG. 6.

The mobile host (MH) sends an association request message to the access point (AP) (6-2), and the access point (AP) sends to the mobile host (MH) a response message to the association request (6-3).

At this time, a MAC address mac1 of the mobile host (MH) is sent to the access point (AP), and the access point (AP) uses the MAC address mac1 and then produces a unique IP address MN.mac1 of the mobile host (MH).

Figures 3, 4:
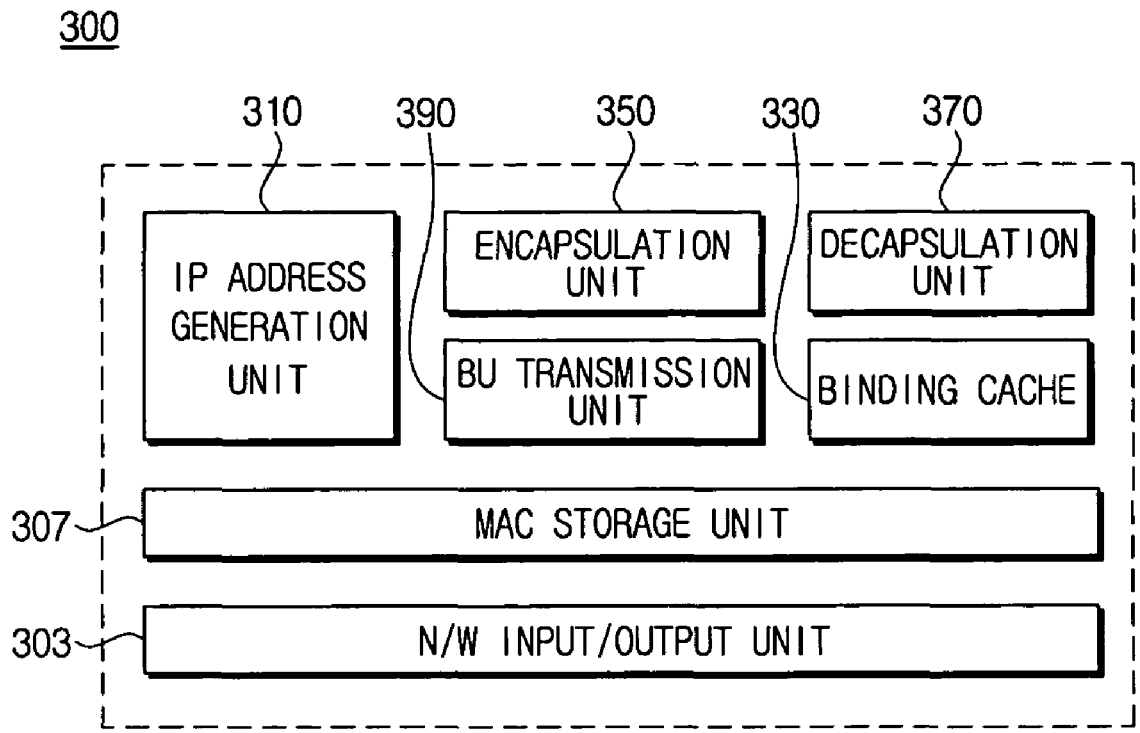
FIG. 3 is a detailed block diagram for showing an access point (AP) 300 of FIG. 2.
FIG. 4 is a view for showing a format of an IP address assigned to mobile hosts by the access point (AP) of FIG. 2

That is, the IP address generation unit 310, as shown in FIG. 4, combines a prefix MN:: allocated from the gateway GW/HA and the MAC address mac1 of the mobile host (MH), and produces the unique IP address MN.mac1 of the mobile host (MH).

The binding cache 330 uses the produced IP address MN.mac1 of the mobile host (MH) as a home address HoA and the IP address of the access point (AP) as a Care-of Address (CoA), and produces a Binding Update list. Thereafter, the BU transmission unit 390 sends to the gateway GW/HA the produced Binding Update list for the mobile host (MH) (6-4).

At this time, the gateway GW/HA produces a binding cache entry (BCE) corresponding to the home address HoA of the mobile host (MH) as in Mobile IPv6.

(2) An access point operation process, when a packet is sent from a correspondent node (CN) to a mobile host (MH), will be described.

Figure 7:
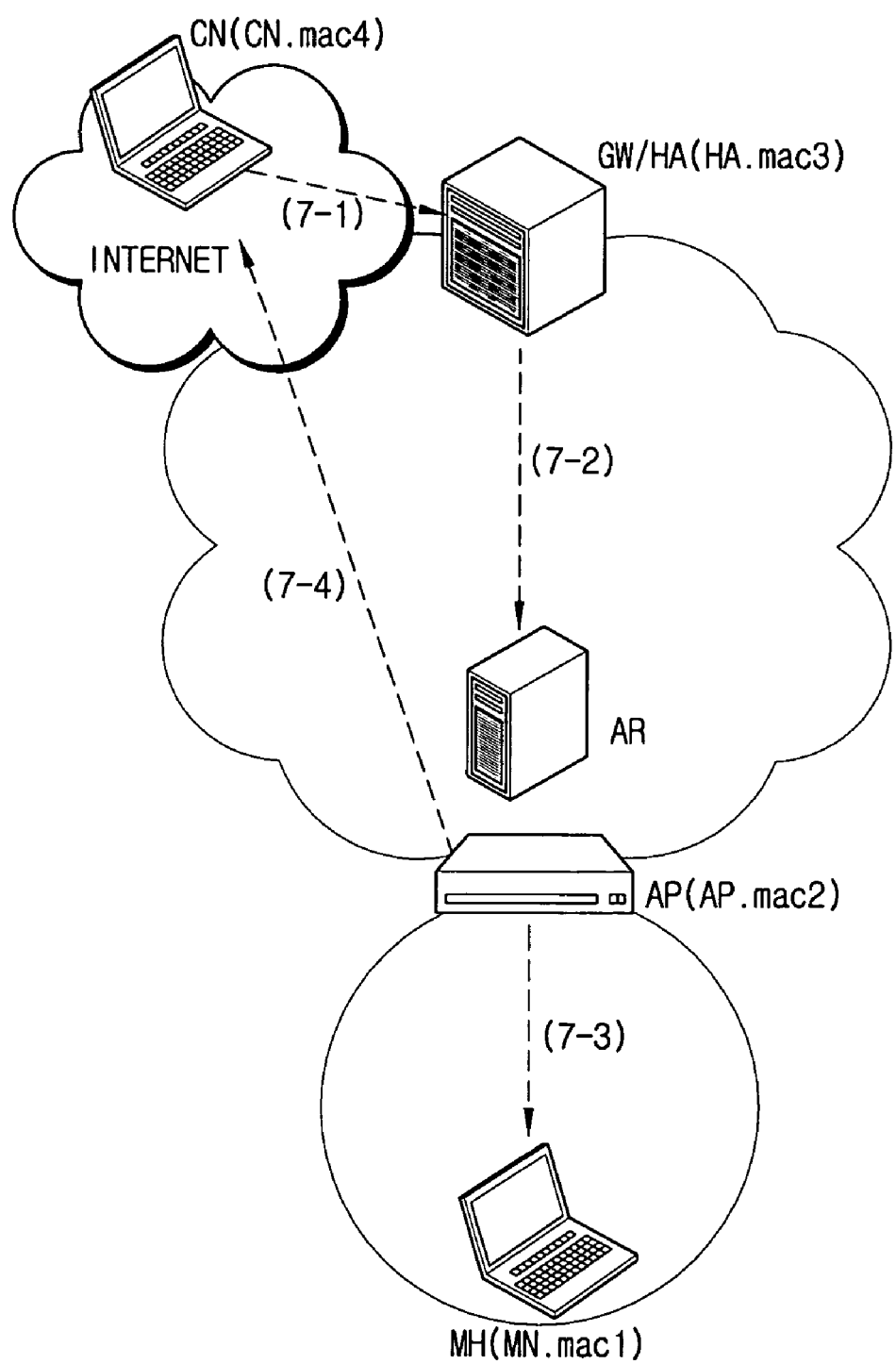
FIG. 7 is a view for showing operation flows for a first packet transmission process (a correspondent node→a mobile host) according to an illustrative embodiment of the present invention.

First, the case that there is no entry for a mobile host (MH) in the binding cache of a correspondent node (CN) will be described with reference to FIG. 7.

Since the correspondent node (CN) has no entry for the mobile host (NM), the correspondent node (CN) uses an IP address CN.mac4 of the correspondent node (CN) as a source address and an IP address MN.mac1 of the mobile host (MH) as a destination address, and sends a packet to the gateway GW/HA (7-1). The gateway GW/HA that has received the packet obtains a CoA having a HoA as an IP address of the mobile host (MH) with reference to a binding cache the gateway GW/HA itself has. Here, the CoA is an IP address AP.mac2 of the access point (AP) in which the mobile host (MH) exists. The gateway GW/HA encapsulates the packet header portion by using the obtained CoA (an IP address of the AP) and an IP address HA.mac3 of the gateway GW/HA. FIG. 8A is a view for showing an encapsulated data packet format. As shown in FIG. 8A, the gateway GW/HA sends the encapsulated packet to the access point (AP) by using the IP address HA.mac3 of the gateway GW/HA as a source address and the IP address AP.mac2 of the access point (AP) as a destination address (7-2).

The encapsulated packet is sent to the access point (AP) being a destination, and the decapsulation unit 370 of the access point (AP) decapsulates header portions from the encapsulated packet, and sends the decapsulated packet to the mobile host (MH) (7-3). At this time, the BU transmission unit 390 of the access point (AP) sends to a correspondent node (CN) a binding update having the IP address MN.mac1 of the mobile host (MH) as a HoA and the IP address AP.mac2 of the access point (AP) as a CoA. FIG. 8B shows a binding update format to be sent. By doing so, the correspondent node (CN) recognizes that the current mobile host (MH) exists in a range of the access point (AP).

Figure 9:
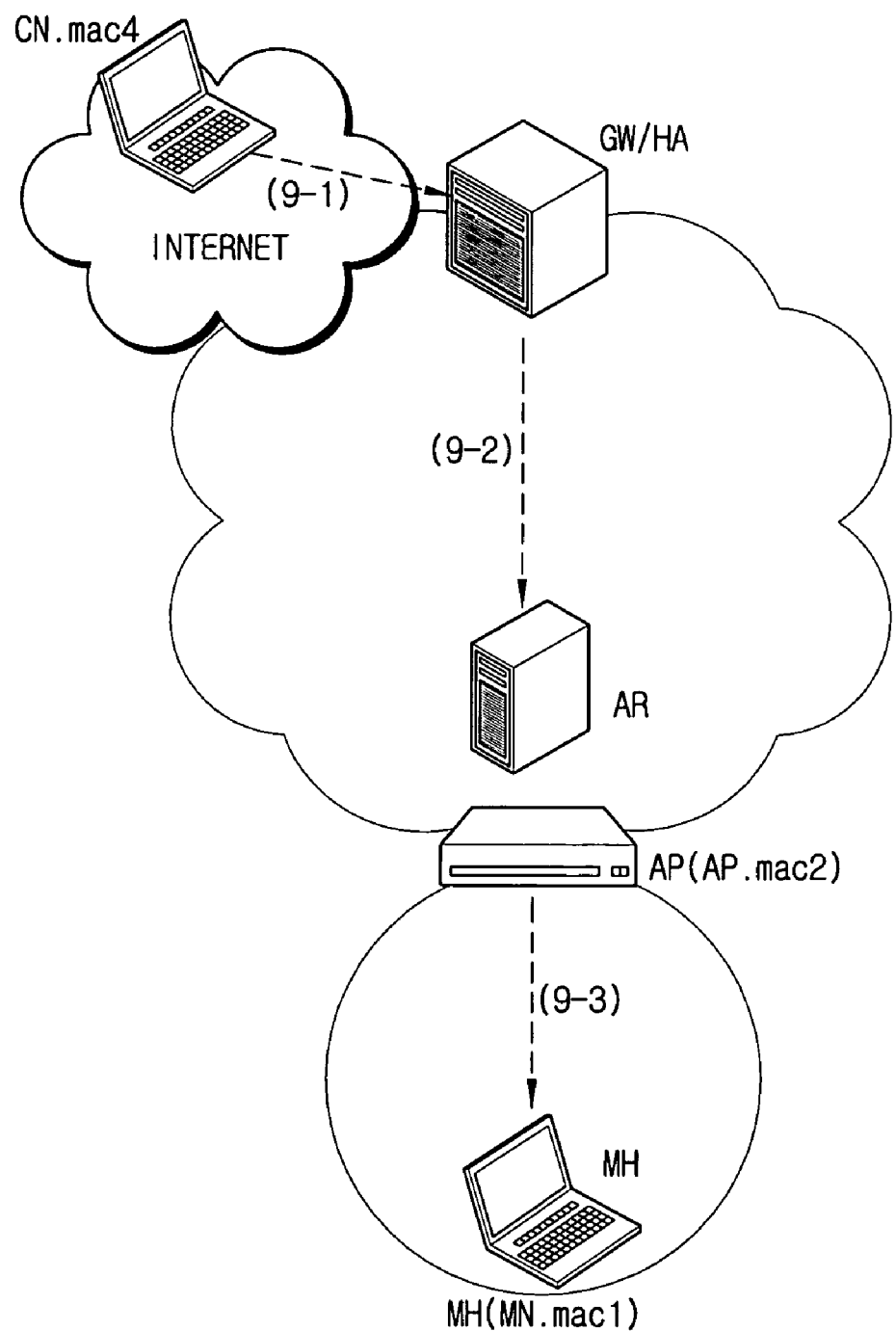
FIG. 9 is a view for showing operation flows for a second packet transmission process (a correspondent node→a mobile host) according to an illustrative embodiment of the present invention.

Next, a description is made on an occasion that there is an entry for a mobile host in the binding cache of a correspondent node (CN) with reference to FIG. 9.

The correspondent node (CN) sends to the gateway GW/HA a packet having an IP address CN.mac4 of the correspondent node (CN) as a source address, a CoA (an IP address of an AP) as a destination address, and an IP address MN.mac1 of a mobile host as a HoA in the header portion, based on binding information in the binding cache (9-1). The packet reaches the access point (AP) without any additional process (9-2), and the access point (AP) translates the destination address (the CoA address) of the header portion into the HoA, the IP address MN.mac1 of the mobile host, and sends the packet to the mobile host (MH) (9-3).

Figures 10, 11:
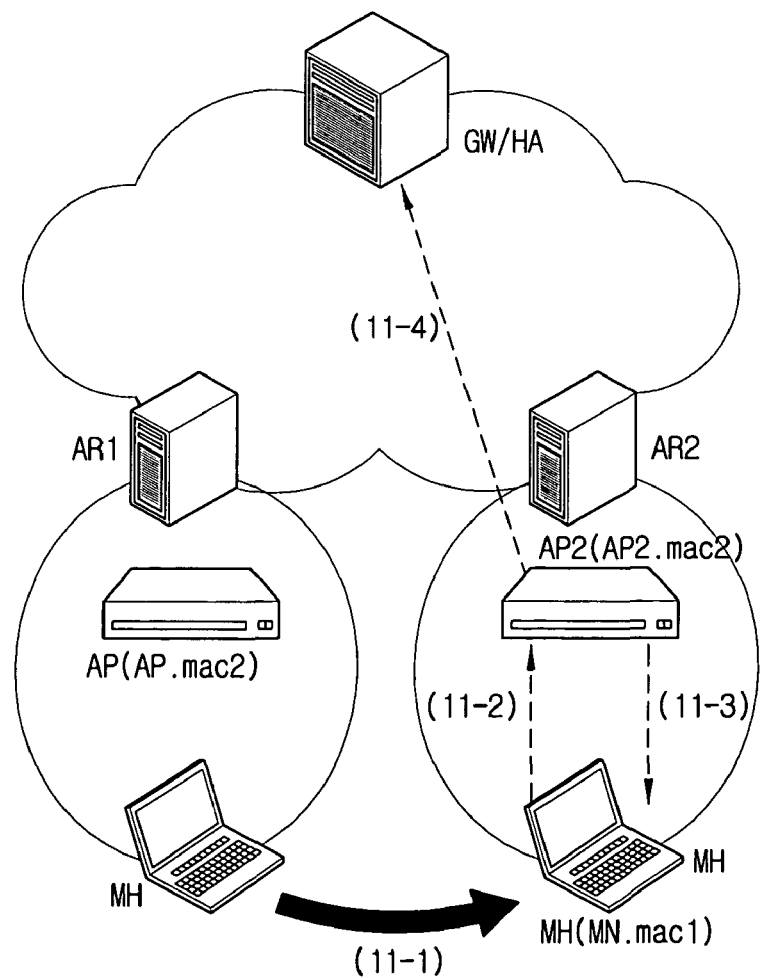
FIG. 10 is a view for showing a format for a packet transmitted to a mobile host in the second packet transmission process of FIG. 9.
FIG. 11 is a view for showing operation flows for a re-association process in a case that a mobile host (MH) associated with an access point (AP) moves into a range of a different access point AP2 according to an illustrative embodiment of the present invention.

Accordingly, the mobile host (MH) receives the packet having the IP address of the correspondent node (CN) as a source address and the IP address of its own as a destination address. At this time, FIG. 10 shows a message packet format to be sent.

(3) A description will be made on an access point (AP) operation process in an occasion that a packet is sent from a mobile host (MH) to a correspondent node (CN).

If a packet is sent from an access point (AP) to a correspondent node (CN), the access point (AP) searches for whether an IP address of the correspondent node (CN) as a destination exists in a HoA entry of the Binding Update list in the binding cache 330, and, if present, decides that the correspondent node (CN) is in a Basic Service Set (BSS) of its own. In this occasion, the access point (AP) encapsulates the header portion of the packet with a mac address of the correspondent node (CN), and sends the encapsulated packet.

In the meantime, if the IP address of the correspondent node (CN) as a destination does not exist in the Binding Update list in the binding cache 330, the encapsulation unit 350 encapsulates the header portion of the packet with a source address and a destination address. That is, the access point (AP) sends to the correspondent node (CN) the packet having an IP address AP.mac2 of the access point (AP) as a source address and an IP address CN.mac4 of the correspondent node (CN) as a destination address, through tunneling.

(4) A description will be made on an operation process for a different access point (AP2) when a mobile host (MH) associated with an access point (AP) moves into a range of the different access point (AP2) (11-1) with reference to FIG. 11.

The mobile host (MH), having moved into a range of the different access point (AP2), performs re-association with the new access point (AP2). The re-association process is the same as the aforementioned association process between a mobile host (MH) and an access point (AP).

That is, the mobile host (MH) requests re-association to the new access point (AP2) (11-2), and the new access point (AP2) sends to the mobile host (MH) a response to the re-association request (11-3) for the re-association. At this time, the IP address generation unit 310 of the new access point (AP2) generates an IP address of the mobile host (MH), and the binding cache 330 produces a Binding Update list. The BU transmission unit 390 sends the Binding Update list to the gateway GW/HA (11-4).

At this time, the gateway GW/HA updates an entry corresponding to the HoA in the binding cache of the gateway GW/HA based on the Binding Update list sent from the new access point (AP2).

Through the above procedures, data between the correspondent node (CN) and the mobile host (MH) associated with the new access point (AP2) is processed with a CoA as the IP address of the new access point (AP2). The communication procedures for the data process are the same as described based on the access point (AP), so the detailed description on the communication procedures will be omitted.

The gateway GW for a wireless local area network according to the present invention has mobile IPv6-based home agent functions, and the access point (AP) can perform part of the mobile IPv6-based home agent functions. Accordingly, a prefix of the gateway is allocated as a prefix of the IP address of the mobile host, so the mobile host has the same prefix all the time regardless of the movements of the mobile host. Accordingly, the IP address of the access point in a range in which the mobile access moves in becomes the CoA of the mobile host, so the mobility for the mobile host can be supported.

According to the present invention, the mobility for mobile hosts is supported in a wireless local area network.

Additionally, the mobility can be supported for all the mobile hosts with or without a mobile IPv6 stack.

Accordingly, the mobility for mobile hosts can be supported in an environment in which the wireless local area network system and the Mobile IPv6 exist together.

The invention has been shown and described with reference to various illustrative embodiments thereof and it will be understood by those skilled in the art that various changes in form and details may be made therein without departing from the spirit and scope of the invention as defined by the appended claims.

What is claimed is:

1. A wireless local area network system, comprising:
   a gateway performing functions of a home agent in a mobile wireless communication environment and sending prefix information; and
   one or more access points, each access point allocating an Internet Protocol (IP) address to a mobile host in a management range thereof by using the prefix information of the gateway,
   wherein said each access point produces and sends a Binding Update list corresponding to the mobile host to the gateway,
   wherein when said mobile host moves into a range of a different access point associated with a new access router, said mobile host retains the prefix information of the gateway,
   wherein the new access router generates an access router advertisement message based on a prefix advertisement message received from the gateway and sends the generated access router advertisement message to said different access point,
   wherein said different access point extracts the prefix information of the gateway based on the access router advertisement message and transfers the extracted prefix information to the mobile host;
   wherein the mobile host receives the prefix information of the gateway and retains the received prefix information, and
   wherein respective mobile hosts in networks controlled by the gateway have a same prefix in addition to a mobile host ID, said mobile host ID being a media access control (MAC) address, and
   wherein said each access point allocates a unique IP address for each mobile host in all the networks controlled by the gateway by combining the prefix information received from the gateway with the mobile host ID received from the mobile host.

2. The wireless local area network system as claimed in claim 1, wherein when a packet is sent from a correspondent node to the mobile host, the gateway encapsulates a header portion of the packet with a source address and a destination address, and an access point corresponding to the destination address decapsulates the encapsulated packet sent from the gateway.

3. The wireless local area network system as claimed in claim 1, wherein when a packet is sent from the mobile host to a correspondent node, the access point defining the management range of the mobile host encapsulates a header portion of the packet with a source address and a destination address and sends the encapsulated packet.

4. The wireless local area network system as claimed in claim 1, wherein the gateway manages one or more access routers, each access router manages one or more access points, and each access point manages one or more mobile hosts.

5. The wireless local area network system as claimed in claim 4, wherein the IP addresses for the mobile hosts have the same prefix information.

6. The wireless local area network system as claimed in claim 1, wherein the IP address for an access point serves as a Care-of Address (CoA) for each mobile host within the management range of the access point.

7. The wireless local area network system as claimed in claim 1, wherein each access point includes:
   an IP address generation unit for generating the IP address for the mobile host in the management range of the access point by combining the prefix information and a MAC address of the mobile host;
   a binding cache for storing information on the generated IP address and corresponding mobile host; and
   a Binding Update (BU) transmission unit for sending to the gateway the produced Binding Update list for the mobile host.

8. The wireless local area network system as claimed in claim 7, wherein each access point further includes a decapsulation unit for decapsulating a source address and a destination address that are encapsulated with a header portion of a packet sent from a correspondent node.

9. The wireless local area network system as claimed in claim 7, wherein each access point further includes an encapsulation unit for encapsulating a header portion of a packet to be sent to a correspondent node with a source address and a destination address.

10. An operation method for a wireless local area network system, comprising:
   sending prefix information of a gateway, by the gateway, according to a request of a mobile host wherein the gateway performs functions of a home agent in a mobile wireless communication environment;
   allocating an Internet Protocol (IP) address to the mobile host by using the prefix information;
   associating the mobile host with an access point having a management range within which the mobile host is located;
   producing a Binding Update list for the associated mobile host; and
   sending the Binding Update list to the gateway,
   wherein when said mobile host moves into a range of a different access point associated with a new access router, said mobile host retains the prefix information of the gateway,
   wherein the new access router generates an access router advertisement message based on a prefix advertisement message received from the gateway and sends the generated access router advertisement message to said different access point,
   wherein said different access point extracts the prefix information of the gateway based on the access router advertisement message and transfers the extracted prefix information to the mobile host; wherein the mobile host receives the prefix information of the gateway and retains the received prefix information, and
   wherein respective mobile hosts in networks controlled by the gateway have a same prefix in addition to a mobile host ID, said mobile host ID being a media access control (MAC) address,
   wherein said access point allocates a unique IP address for each mobile host in all the networks controlled by the gateway by combining the prefix information received from the gateway with the mobile host ID received from the mobile host, and allocates the unique IP address to the mobile host.

11. The operation method as claimed in claim 10, further comprising, when a packet is sent from a correspondent node to the mobile host,
   encapsulating a header portion of the packet at the gateway with a source address and a destination address and sending the encapsulated packet; and
   decapsulating a header portion from the encapsulated packet sent from the gateway.

12. The operation method as claimed in claim 10, further comprising, when a packet is sent from the mobile host to a correspondent node, encapsulating a header portion of the packet at the access point with a source address and a destination address, and sending the encapsulated packet.

13. The operation method as claimed in claim 10, wherein the gateway manages one or more access routers, each access router manages one or more access points, and each access point manages one or more mobile hosts.

14. The operation method as claimed in claim 13, wherein the IP addresses for the mobile hosts have the same prefix information.

15. The operation method as claimed in claim 13, wherein an IP address for each access point serves as a Care-of Address (CoA) for each mobile host within the management range of the access point.

16. The operation method as claimed in claim 10, wherein the mobile host association operation includes:
   generating the IP address for the mobile host in the management range of the access point by combining the prefix information of the gateway and a MAC address of the mobile host;
   storing information on the generated IP address and the corresponding mobile host;
   producing a Binding Update list of the associated mobile host; and
   sending to the gateway the produced Binding Update list for the mobile host.

* * * * *